United States Patent Office 2,978,781
Patented Apr. 11, 1961

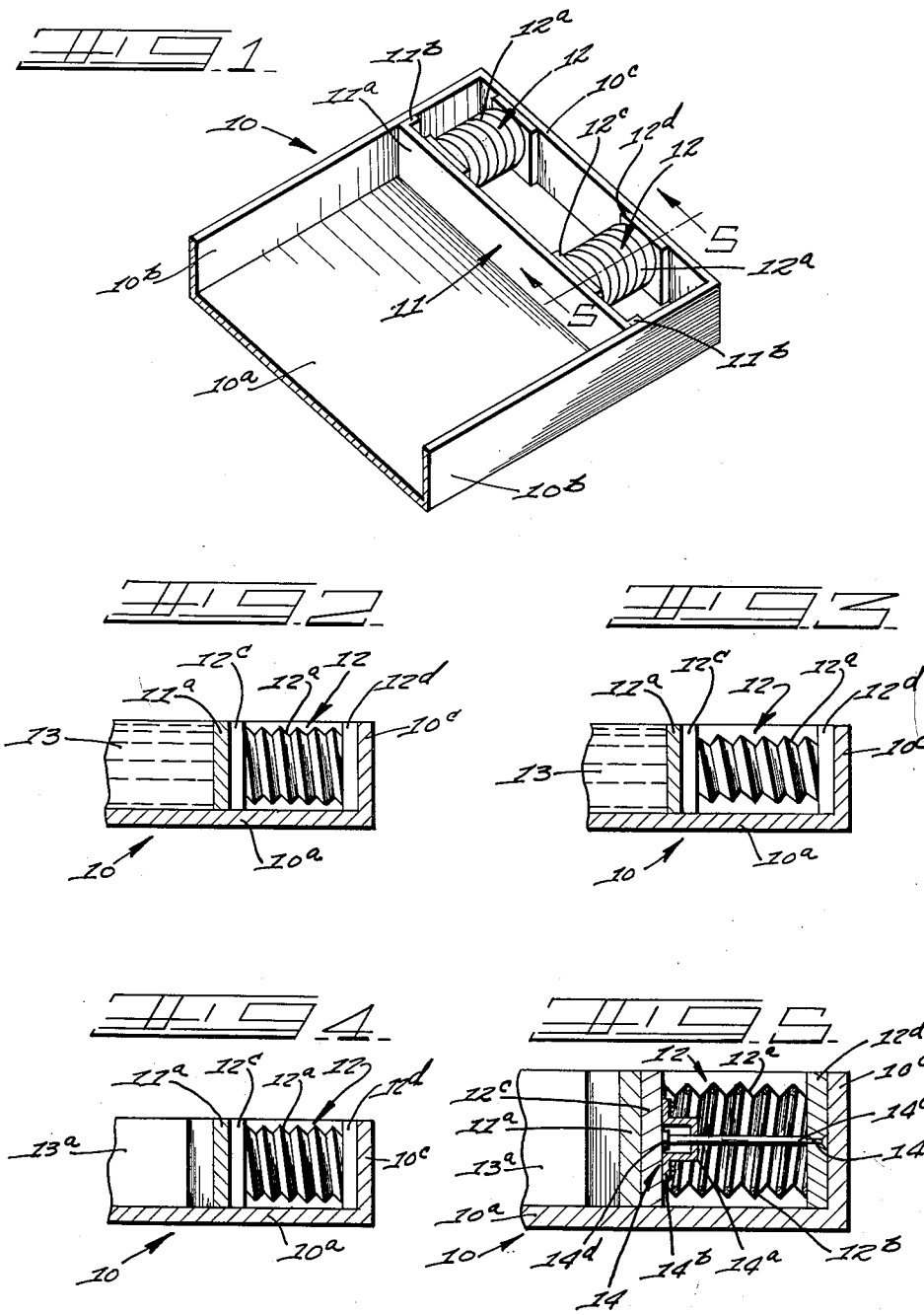

2,978,781

MOLD EXPANSION AND CONTRACTION COMPENSATING DEVICE

Everett C. Shuman, Toledo, Ohio, assignor, by mesne assignments, to Owens-Corning Fiberglas Corporation, a corporation of Delaware Filed Oct. 28, 1957, Ser. No. 692,809

9 Claims. (Cl. 25—121)

The present invention relates generally to an improvement in molds of the type ordinarily utilized for molding heat-setting or heat-hardenable fluid materials at elevated temperatures and, more particularly, to a device for counteracting the thermal expansion and contraction of the mold occasioned during the heating and cooling phases of the molding process.

The ordinary prior art practice of molding blocks, slabs, tiles, and other similar articles from heat-setting or heat-hardenable fluid slurries of cementitious materials consists of introducing a fluid, homogeneously mixed slurry such as, for example, a hydrous alkali metal silicate slurry or the like, into a pan-type mold of the desired shape and dimensions, and then subjecting the mold and slurry to elevated temperatures of a magnitude sufficient to effect a hardening or induration of the slurry. However, as the temperature is elevated during the initial phases of the molding process, thermal expansion of the mold takes place and the fluid slurry assumes the shape of the expanded mold. Subsequently, after the slurry has reacted and thus attained a hardened condition, the temperature is lowered to permit handling and removal of the molded article, but as an incident of the reduction in temperature, the mold contracts and compresses the article within the mold. Thus, due to the extreme expansion and contraction of the mold relative to the contents therein, difficulty is often experienced in removing the hardened article from the mold without damaging either the article or the mold, or both. In order to overcome this adverse condition, it has frequently been found necessary to modify the shape of the walls of the mold, such as by tapering the side walls of the mold to expedite removal of the article. However, when this is done a subsequent trimming operation is ordinarily necessitated to remove the tapered edge consequently formed on the molded article.

Accordingly, it is an object of the present invention to provide an improved mold structure for molding heat-hardenable or heat-setting fluid substances, such as slurries of cementitious materials and the like, which is particularly adapted to obviate the difficulties mentioned above with respect to thermal expansion and contraction of the mold.

Another object of the present invention is to provide an improved mold of the aforementioned type, which is characterized by the provision of means for compensating for thermal expansion and contraction of the mold, and which thereby facilitates the release and removal of the hardened article from the mold.

A further object of the present invention is the provision of a compartmented mold having a movable partition therein, which is operative in direct response to the application and removal of heat during the molding process to compensate for the thermal expansion and contraction of the mold.

A further object of the present invention is the provision of suitable means for limiting the extent of movement of the mold partition between selected alternative positions.

The specific nature of this invention, as well as other objects and advantages thereof, will become apparent to those skilled in the art from the following detailed description taken in conjunction with the annexed sheet of drawings on which, by way of example only, one preferred embodiment of this invention is illustrated.

In the drawings:

Fig. 1 illustrates a perspective fragmentary view of a mold having the present invention embodied therein.

Figs. 2–4 are fragmentary side elevational views of the mold embodying the present invention with the side of the mold being omitted for purpose of clarity, and illustrating in comparative relationship the functional aspect of the invention.

Fig. 5 is an enlarged vertical sectional view of the present invention taken along the line 5—5 of Fig. 1.

In the illustrated embodiment of this invention, the mold 10 is of metallic, pan-type construction, such as is ordinarily utilized for molding conventional, structural slabs or blocks from slurries of cementitious heat-setting or heat-hardenable materials, such as, for exemplary purposes only, hydrous slurries of alkali-metal silicate mixtures, which, as is well known in the prior art, are reactive under the influence of elevated temperature conditions and transform into a reaction product possessing an integrated porous structure normally exhibiting highly desirable thermal insulating characteristics. As illustrated, the mold 10 consists of a flat rectangular bottom 10a integrally connected about its margin to upstanding sides 10b and ends 10c, which are welded or otherwise fastened together in fluid-tight endwise relationship to form a rectangular wall extending continuously around the mold bottom. Obviously however, the scope of the present invention is not intended to be limited to a rectangular mold, and is well suited to curved and other variously shaped molds as well.

In accordance with the present invention, the mold 10 is compartmented by the provision of one or more movable walls, such as a transverse partition 11, which is arranged to move laterally to counteract or compensate for the thermal expansion and contraction of the mold occurring during the molding process. The partition 11, like the mold 10, is preferably of metallic construction and is comprised of a medial section 11a defining an inwardly facing molding surface and outwardly disposed end portion 11b abutting the sides 10b of the mold for free relative movement. To prevent leakage between the abutting surfaces of the mold 10 and the partition 11, a lining of graphite impregnated asbestos, or other material having similar properties of sealability, lubricity and capability of withstanding elevated temperatures, may be cemented or otherwise secured to the mold abutting surfaces of the partition to form a slidable fluid-tight seal between the partition and the mold.

Means for imparting lateral movement to the partition 11 is provided in the form of a compensating device 12, two such identical devices being shown in Fig. 1, which operates in direct response to temperature changes occurring during the molding process to shift the partition 11 laterally inward or outward relative to the contents within the mold. Structurally, the compensating device 12 comprises a hollow transversely pleated covering 12a fabricated from a suitable fluid-impervious material to form a bellows-type unit containing a heat-expansible fluid medium such as water, steam, air, carbon dioxide, hydrogen, nitrogen, etc., or the like, which is capable of expanding and contracting in response to temperature changes occurring during the molding process. Assembled within the interior of the covering 12a there is a spring coil 12b, or other similar means, which is tensionally stressed when the expansible fluid medium is expanded under the influence of an elevation in temperature. This tensional stress in the spring coil 12b thus acts to retract the compensating device 12 and partition 11 when the pressure exerted by the expansible fluid medium is reduced as a consequence of a reduction in temperature. The spring coil 12b is positioned axially within the covering 12a and is secured endwise to plates 12c and 12d which are suitably affixed to opposite axial ends of the compensating device 12 in gas-tight relationship and which in turn are anchored respectively to the partition 11 and the end 10c of the mold 10. Although the bellows-type construction described above is illustrated as having multiple convolutions, it is understood that in certain instances a single convolution may be sufficient, particularly where the extent of the movement desired is small.

By virtue of the preceding construction, the fluid medium will expand when heated during the molding process and cause the compensating device 12 to extend and move the partition 11 inwardly. Thus, as the mold 10 increases in size due to thermal expansion, the partition 11 moves inward to decrease the volumetric capacity of the mold and compensate for such expansion. Conversely, when the mold 10 and the fluid medium are cooled, the partition 11 will be retracted due to the tension in the spring coil 12a. In the aforedescribed manner, as heat is applied to harden or set the slurry during the heating phase of the molding process, the movable partition 11 will be urged inwardly to accommodate the expansion of the compensating device 12. Further, after the slurry has been hardened sufficiently, the heating phase of the process may be terminated and the heat permitted to dissipate. During this latter phase of the molding process, the fluid medium will contract and the spring coil 12a will retract the compensating device 12 and withdraw the partition 11 from the hardened material to facilitate the release and subsequent removal of the hardened material from the mold 12.

Figs. 2, 3, and 4 schematically represent the functional aspect just described. As illustrated in Fig. 2, the compensating device 12 is shown in its retracted position, which corresponds to the position it will occupy prior to the application of heat to the fluid slurry 13. For purposes of comparison, it will be observed in Fig. 3, corresponding to the heating phase of the process, that the compensating device 12 has attained an extended position resulting from the expansion of the heated fluid medium. According to procedures well known in the art, continued application of heat to the fluid slurry 13 will cause the slurry to react and transform into a rigid self-supporting structure having a configuration conforming to the shape of the mold 10. Then, as illustrated in Fig. 4, as the molded material 13a is permitted to cool, the compensating device 12 will retract and withdraw the partition 11 away from said material.

Means for restricting the movement of the partition 11 between alternative selected positions is provided by the inclusion of a movement-limiting device 14 situated within the interior of the compensating device 12. As illustrated in Fig. 5, the movement-limiting device 14 comprises a hub 14a having an outwardly flanged base 14b bolted or otherwise secured to the plate 12c, a rod 14c of elongated dimension having an enlarged inner end 14d slidably confined within the hub 14a and an outer end 14e secured to the plate 12d by conventional adjustable means.

The above-described embodiment of the present invention exemplifies a compensating device 12 for counteracting the thermal expansion and contraction occurring in a mold utilized for molding various types of cementitious materials and the like at elevated temperatures. The compensating device operates in direct response to temperature changes occurring during the heating and cooling phases of the molding process to automatically regulate the volumetric capacity of the mold and compensate for the thermal expansion and contraction thereof. The compensating device is of simple construction capable of being employed in conventional mold structures, such as are presently utilized in the molding of blocks, slabs and tiles from slurries of cementitious materials. Additionally, the molded materials may be readily removed from the mold without the danger of damage to the material or to the mold, as has heretofore been experienced. Further, the provision of a movement-limiting device permits the compensating movement of the partition to be controlled and restricted between alternative selected positions. This latter feature is particularly important where it is desirable that the molded material conform to certain predetermined dimensional characteristics.

It will, of course, be understood that various details of construction may be modified throughout a wide range of equivalents, and it is, therefore, not the purpose to limit the scope of the present invention otherwise than as necessitated by the scope of the appended claims.

I claim:

1. In a mold for indurating heat-setting fluid materials, a molding member shiftably mounted within said mold and defining part of the molding surface therefor, said molding member being shiftable between alternative positions relative to other parts of the molding surface of said mold thereby varying the volumetric molding capacity of said mold, compensating means responsive to temperature variations for shifting said molding member between said alternative positions in directions compensating for changes in the volumetric molding capacity resulting from thermal expansion and contraction of said mold.

2. The combination defined in claim 1, wherein said compensating means comprises a resilient pressure-actuated bellows.

3. In a mold for indurating a heat-setting fluid material, a shiftable member defining a portion of the molding surface for said material, the movements of said shiftable member being relative to other molding surface portions to vary the volumetric capacity of said mold; temperature responsive compensating means for shifting said shiftable member in directions compensating for thermal expansion and contraction of said mold in response to the application of heat to set said material; and means for limiting said shifting movement between predetermined alternative positions.

4. In a mold for indurating a heat-setting fluid material, a shiftable mold member defining a molding surface for said material, said shiftable mold member being shiftable between alternative positions to vary the volumetric molding capacity of said mold while said heat-setting fluid material is contained within said mold; temperature responsive compensating means for shifting said shiftable mold member between said alternative positions in response to the application of heat to set said material, said temperature responsive compensating means comprising a pressure-actuated, extensible member operatively directing the movements of said shiftable mold member and having a stroke corresponding to the distance between said alternative positions thereof, said extensible member having a hollow extensible portion defining a fluid chamber positioned for exposure to the heat applied to set said material; and a heat-expansible fluid contained within said fluid chamber actuating said extensible member and coordinating the movements of said shiftable member in a manner compensating for thermal expansion and contraction of said mold during the induration of said fluid material.

5. In a mold for indurating a heat-setting fluid material, a shiftable mold member defining a portion of the molding surface for said material, said shiftable mold member being shiftable between alternative selected positions relative to other molding surface portions to vary the volumetric molding capacity of said mold while said heat-setting fluid material is contained within said mold, means responsive to temperature variations for shifting said shiftable mold member between said alternative positions in directions compensating for thermal expansion and contraction of said mold in response to the application of heat to set said material, said shifting means comprising a pressure-actuated, extensible member operatively directing the shifting movements of said shiftable mold member, said extensible member having a resiliently expansible tubular portion defining a fluid chamber positioned for exposure to the heat applied to set said material, a heat-expansible fluid contained within said fluid chamber actuating said extensible chamber, and means for limiting the stroke of said extensible member between said alternative selected positions.

6. The combination defined in claim 5, wherein said extensible member is provided with means resiliently opposing actuation thereof by said heat-expansible fluid.

7. In a cavity-type mold for indurating a heat-setting fluid material, a shiftable mold wall nested within the mold cavity and cooperating therewith to define a molding surface for said material, said shiftable mold wall being shiftable relative to said mold between alternative positions to vary the volumetric capacity of said mold; compensating means for shifting said mold wall between said alternative positions in response to heating and cooling of said material and in directions compensating for thermal expansion and contraction of said mold, said compensating means comprising a pressure actuated axially hollow extensible member having a stroke corresponding to the distance between said alternative mold wall positions, the hollow portion of said extensible member forming an axially expansible fluid chamber positioned for exposure to the heat applied to set said material; and a heat-expansible fluid contained within said fluid chamber actuating said extensible member.

8. In a cavity-type mold for indurating a heat-setting fluid material, a shiftable mold wall nested within said mold and cooperating therewith to define a molding surface for said material, said shiftable mold wall being shiftable between alternative spaced positions to vary the volumetric capacity of said mold; temperature responsive compensating means for shifting said mold wall between said alternative positions in response to heating and cooling of said material and in directions compensating for thermal expansion and contraction of said mold, said temperature responsive compensating means comprising a pressure-actuated bellows positioned for exposure to the heat applied to set said material, said bellows having a stroke imparting controlled compensating movements to said mold wall between said alternative mold wall positions; and a heat-expansible fluid contained within said bellows actuating the stroke thereof.

9. In a mold for indurating a heat-setting fluid material, a shiftable member carried by said mold and cooperating therewith to define a molding surface for said material, said shiftable member being shiftable between alternative inner and outer positions to vary the volumetric capacity of said mold; temperature responsive compensating means for shifting said shiftable member between said alternative positions in response to the application of heat to set said material and in directions compensating for thermal expansion and contraction of said mold, said temperature responsive compensating means comprising a pressure-actuated, expansible fluid chamber positioned for exposure to the heat applied to set said material and operatively interconnected to said shiftable member to impart shifting movement thereto; a heat-expansible fluid contained within said fluid chamber actuating said shiftable member toward said inner position when heat is applied to said material; and resilient means yieldably opposing actuation of said shiftable member toward said inner position and actuating same toward said outer position when heat is dissipated from said heat-expansible fluid during cooling of said material.

References Cited in the file of this patent

UNITED STATES PATENTS

| | | |
|---|---|---|
| 1,387,066 | Murray | Aug. 9, 1921 |
| 1,634,047 | Smith | June 28, 1927 |
| 1,989,957 | Walters | Feb. 5, 1935 |
| 2,235,906 | Skoning | Mar. 25, 1941 |
| 2,247,376 | Heuer | July 1, 1941 |
| 2,614,309 | Price | Oct. 21, 1952 |
| 2,648,167 | Ellwood | Aug. 11, 1953 |
| 2,745,139 | Burton | May 15, 1956 |
| 2,864,127 | Marti | Dec. 16, 1958 |

FOREIGN PATENTS

| | | |
|---|---|---|
| 771,236 | Great Britain | Mar. 27, 1957 |